United States Patent [19]

Kümmel et al.

[11] Patent Number: 4,891,048
[45] Date of Patent: Jan. 2, 1990

[54] METHOD OF MANUFACTURING A TERMINAL LEAD-THROUGH FOR A BATTERY CONSISTING OF CELLS PILED ON EACH OTHER

[75] Inventors: Karen Kümmel, Lyngby; Bjorn Eiriksson, Herfølge, both of Denmark

[73] Assignee: A/S Hellesens, Køge, Denmark

[21] Appl. No.: 186,744

[22] Filed: Apr. 25, 1988

Related U.S. Application Data

[63] Continuation of Ser. No. 912,847, Sep. 29, 1986.

[30] Foreign Application Priority Data

Oct. 4, 1985 [DK] Denmark ............................ 4547/85

[51] Int. Cl.[4] ........................ H01M 6/00; H01M 6/46
[52] U.S. Cl. ................................... 29/623.1; 429/152; 429/158; 29/623.2
[58] Field of Search ................. 429/152, 158, 159; 29/623.1, 623.2

[56] References Cited

U.S. PATENT DOCUMENTS

| | | |
|---|---|---|
| 1,675,978 | 7/1928 | Klock et al. . |
| 2,024,637 | 12/1935 | Geyer . |
| 3,871,921 | 3/1975 | Beatty et al. . |
| 3,954,505 | 5/1976 | Anderson ........................ 429/158 |
| 4,060,670 | 11/1977 | Tamminen ..................... 429/159 X |
| 4,076,908 | 2/1978 | Bäcker et al. ..................... 429/184 |
| 4,245,014 | 1/1981 | Veit, Jr. et al. ................... 429/181 |
| 4,321,315 | 3/1982 | Jensen ............................. 429/152 |
| 4,326,016 | 4/1982 | Selover, Jr. et al. ............. 429/184 |
| 4,505,996 | 3/1985 | Simonton ..................... 429/159 X |

FOREIGN PATENT DOCUMENTS

| | | |
|---|---|---|
| 132726 | 1/1976 | Denmark . |
| 144449 | 3/1982 | Denmark . |
| 129837 | 1/1985 | European Pat. Off. . |
| 2527576 | 1/1976 | Fed. Rep. of Germany . |
| 2323917 | 3/1976 | Fed. Rep. of Germany . |
| 2420879 | 9/1976 | Fed. Rep. of Germany . |
| 2064204 | 6/1981 | United Kingdom . |

Primary Examiner—Stephen J. Kalafut
Attorney, Agent, or Firm—Cushman, Darby & Cushman

[57] ABSTRACT

A method of manufacturing a battery consisting of one or several cells piled on each other and integrally connected along their circumferences. Each cell comprises a zinc anode, an alkaline electrolyte, a cathode of mercuric oxide, silver oxide or manganese dioxide or a mixture thereof, and a cell casing in the form of a plastic cup. A terminal plate is located on both sides of the plastic cup, said terminal plates abutting a substantial area of the outer and the inner side of the bottom, whereby at least one terminal plate comprises at least one projecting knob extending through a comparatively small aperture in the bottom of the cup and being connected by spot welding to the second terminal plate in such a manner that the plates sandwich and under pressure abut the material in the bottom of the cup. Prior to the spot welding a mass is added in the form of bitumen to the aperture in the bottom of the cup, the sealing mass being pressed sideways during the spot welding. The sealing mass is added as a drop, which need not hit the aperture in the bottom of the cup with a particularly high accuracy. This part of the manufacturing process is thus simplified and consequently more suited for mass production. To this should be added that the sealing mass adheres to the metal surfaces and prevents the electrolyte from travelling along the metal surfaces.

3 Claims, 1 Drawing Sheet

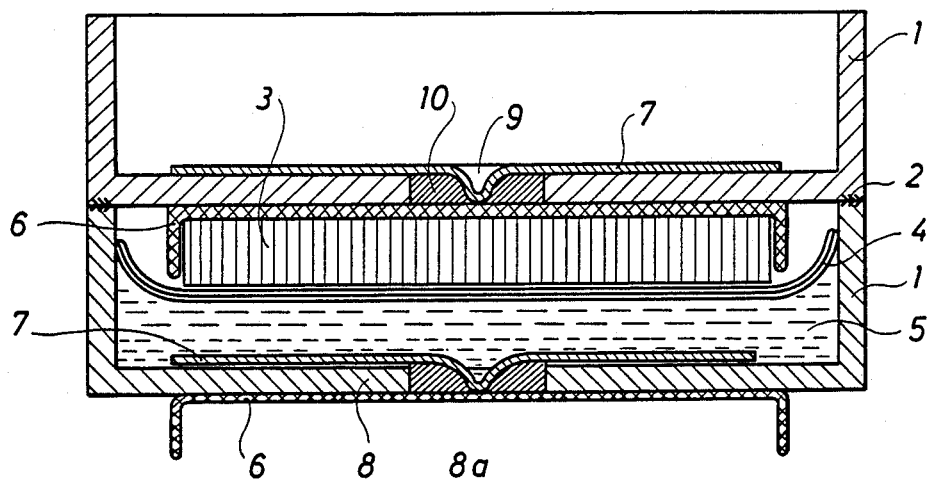

METHOD OF MANUFACTURING A TERMINAL LEAD-THROUGH FOR A BATTERY CONSISTING OF CELLS PILED ON EACH OTHER

This is a continuation of application Ser. No. 912847, filed Sept. 29, 1986, which was abandoned upon the filing hereof.

FIELD OF THE INVENTION

The present invention relates to a method of manufacturing a terminal lead-through for a battery consisting of one or several cells piled on each other and integrally connected along their circumferences, each cell comprising a zinc anode, an alkaline electrolyte, a cathode of mercuric oxide, silver oxide or manganese dioxide or a mixture thereof, and a cell casing in the form of a plastic cup, in which a terminal plate is located on the inner as well as on the outer side of the bottom of each cup, said terminal plates abutting a substantial area of the outer and the inner side of the bottom, whereby at least one terminal plate comprises at least one projecting knob extending through an aperture located in the bottom of the cup and being comparatively small relative to the diameter of the bottom of the cup, said knob furthermore being connected by spot welding to the second terminal plate in such a manner that the plates sandwich and under pressure abut the material of the bottom of the cup, which is composed of or incorporates elastomeric material.

DESCRIPTION OF THE PRIOR ART

U.S. Patent Specification No. 4,321,315 discloses the sealing of a terminal lead-through by means of a rubber O-ring. Such an O-ring is, however, relatively expensive compared to the total cost of production of the element. In addition the mounting should be performed with a fairly high accuracy to keep the percentage of discarding reasonably low.

SUMMARY OF THE INVENTION

The object of the invention is to provide a more simple method of sealing a terminal lead-through, and according to the invention this object is obtained by a drop of a sealing mass known per se being added to the aperture in the bottom of the cup prior to the spot welding, thus utilizing the fact that the sealing mass is pressed sideways during the spot welding to avoid centering problems. The sealing mass known per se is added as a drop, which need not hit the aperture in the bottom of the cup with a particularly high accuracy. As a result this part of the manufacturing process is simplified and will thus be more suitable for mass production. The sealing mass is furthermore considerably more inexpensive than the sealing ring used so far.

BRIEF DESCRIPTION OF THE DRAWING

The invention will be explained below with reference to the accompanying drawing illustrating a terminal lead-through in a battery consisting of flat cells.

DESCRIPTION OF PREFERRED EMBODIMENTS

The drawing illustrates two plastic cups 1 forming cell casings. The casings are interconnected by means of contacting surfaces 2 in a process influencing the entire periphery at the same time. Such an instant influence may for instance be produced by means of ultrasonic welding, gluing, immersion, hot welding, high frequency welding or another similar process.

The lowermost cup contains a pressed cathode 3 of mercuric oxide, silver oxide or manganese dioxide or mixtures thereof, two separator diaphragms 4 and an anode 5 consisting of powdered zinc in an alkaline electrolyte. A terminal plate 6 with bent edges is located above the cathode 3 and a second terminal plate 7 is located below the anode 5 in the bottom of the cup.

The terminal plates 6 and 7 in plastic cups 1 piled on each other are interconnected through a aperture 8a in the centre of the bottom 8 of the uppermost cup 1, one of the terminal plates 7 comprising an embossed, projecting knob 9 extending through the aperture 8a in the bottom 8 of the cup and furthermore being spot welded to the centre of the second terminal plate 6. The spot welding is performed in such a manner that the terminal plates 6 and 7 sandwich the material in the bottom 8, whereby a pressure sealing is established between the terminal metals (6, 7) and the elastomeric material in the bottom. As the terminal plates squeeze against both sides of the bottom, a double sealing is obtained between metal and plastic polymer surfaces under a specific sealing pressure, said sealing pressure being very high across the relatively small sealing area. Furthermore, the terminal plate 6 may optionally consist of a metal particularly impeding for the reduction of $O_2$ and $H_2O$ etc., whereby an additional security against leakage is obtained. The battery illustrated furthermore provides a long electrolyte leakage path.

The sealing is according to the invention provided by a sealing mass 10 being added to the aperture 8a in the bottom of the cup prior to the spot welding of the terminal plates 6 and 7, as the sealing mass 10 is pressed sideways during the spot welding and automatically penetrates into all corners. The sealing mass is added as a drop, which need not hit the aperture 8a in the bottom 8 of the cup with a particularly high accuracy. As a result this part of the manufacturing process is simplified and will thus be more suitable for mass 10 production. The sealing mass preferably consists of bitumen mixed with a solvent, such as white spirit. The diameter of the aperture is preferably about 4 mm. The sealing mass 10 adheres to the metal surfaces and thus prevents the electrolyte from travelling along the metal surfaces.

A pointed or a rounded electrode may e.g. be used for spot welding together with a substantially plane electrode.

According to an alternative embodiment, several pole lead-throughs from one cell to the other are provided, e.g. three or four pole lead-throughs; these pole lead-throughs may be provided along a circle concentric with the cup. The pole lead-throughs and the knobs are preferably mutually located at the same angular distance. According to a particularly preferred embodiment the knops are dovetailed.

The manganese dioxide-carbon briquette is in contact with a metal terminal 6. A satisfactory contact must, however, be established between the manganese dioxide-carbon briquette and the metal terminal 6, this connection determining the short-circuit current. If a rectangular terminal with bendings along all four rims was used, the bendings would curve upwards with a consequent insufficient connection. According to the invention a bent metal piece has been used with bendings along two opposing rims, said bendings turning about 1°–3° inwards. A sufficiently good fixing of the manganese dioxide-carbon briquette is consequently obtained.

The terminal 6 must of course be made of a suitably resilient material, such as nickel-plate iron, thus permitting a short-circuit current of 3–5 A. This problem did not exist in the previous circular cells, as the electrode mass in question was added under pressure and thus established the necessary contact; the fact that the cylindrical body was capable of absorbing the pressure concerned without disturbing the contact was thus utilized.

The inventive method is furthermore suited for mass production, as the terminal body is symmetrical, and the manganese dioxide-carbon briquettes can be pushed in from sideways, if only their corners are rounded.

The terminal is optionally provided with an additional bending; as a result a certain contact can also be established at the bottom surface. The width of the briquettes is about 0.06–0.08 mm smaller than the terminal; the fact that the briquettes expand to a small extent due to the release of voltage in connection with the addition of electrolyte has consequently been taken into account.

In a specific embodiment the terminal has a height of 2.7 mm, a length of 17.5 mm and a width of 13.08 mm. The thickness of the material is about 0.1–0.3 mm.

Each terminal plate has a thickness of 0.3 mm. Contact between the two terminals is established by the two welding electrodes being pressed towards each other and pressing the sealing material to the side. The welding pressure is 650N, and the time of current is max 8 m sec. One of the electrodes has a point diameter of 1.55 mm, and the second electrode has a point diameter of 6.35 mm. The sealing mass 10 consists of 4 parts of bitumen, one part of microcrystalline wax and two parts of white spirit.

We claim:

1. A method of manufacturing a terminal lead-through for a battery having first and a second cell casing, each said cell casing having a top and a bottom, an aperture in the bottom of said first cell casing, a first terminal plate on the bottom of each cell casing, an anode on the first terminal plate in each cell casing, a cathode in each cell casing, a separator between said cathode and said anode in each cell casing, and a second terminal plate on the cathode; comprising the steps of:

placing said first cell casing on top of said second cell casing;

connecting said first cell casing and said second cell casing together;

placing a sealing mass in the aperture of said first cell casing; and spot welding through the sealing mass into the aperture of said first cell casing so that the sealing mass is pressed sideways and penetrates into all areas of the aperture and so that a projecting knob forms on the first terminal plate and projects into the aperture so that it is in contact with the second terminal plate of the second cell casing.

2. A method as in claim 1 wherein said spot welding step is accomplished by the use of a rounded electrode.

3. A method as in claim 1 wherein said spot welding step is accomplished by the use of comparatively pointed electrode and a substantially plane electrode.

* * * * *